2,951,744
METHOD OF PREPARING CYANOGEN

William L. Fierce, Crystal Lake, and Walter J. Sandner, Carpentersville, Ill., assignors to The Pure Oil Company, Chicago, Ill., a corporation of Ohio No Drawing. Filed Nov. 10, 1958, Ser. No. 772,713

10 Claims. (Cl. 23—151)

This invention relates to new and useful improvements in processes for the preparation of cyanogen, and more particularly to a process in which a ketone cyanohydrin is reacted with a cupric salt in aqueous alkaline solution.

Cyanogen $(CN)_2$ is a well known compound which is useful as an intermediate in the preparation of a variety of organic compounds. Classical methods of producing cyanogen include (1) dehydration of ammonium oxalate, (2) thermal decomposition of mercuric cyanide, and (3) reaction of sodium cyanide and copper sulfate solutions, wherein part of the cyanogen is evolved as cyanogen gas and part remains as cuprous cyanide. Cyanogen is useful in the preparation of a variety of organic compounds, e.g., aliphatic nitriles, cyanic acid, and oxamide.

It is one object of this invention to provide a new and improved method for the production of cyanogen.

Another object of this invention is to provide a method for preparing cyanogen which does not involve the handling of the highly toxic hydrogen cyanide gas.

A feature of this invention is the provision of an improved process for the preparation of cyanogen by reaction of a ketone cyanohydrin with a cupric salt in alkaline solution at ambient temperatures in the range of 15°–90° C.

Other objects and features of this invention will become apparent from time to time throughout the specification and claims as hereinafter related.

This invention is based upon our discovery that cyanogen is produced in good yields by the reaction of a ketone cyanohydrin and a cupric salt in aqueous alkaline solution at moderate temperatures.

The Jacquemin method for the preparation of cyanogen by the action of potassium cyanide (KCN) on cupric sulfate ($CuSO_4$) has been in use for many years and is now a standard laboratory method for preparing cyanogen. G. Hahn and W. Leopold described the method in considerable detail in Ber., 68, 1974 (1935), B. Ricca in Ann. Chim. Applicata, 16, 83 (1926), also discusses this reaction, and the method is described in detail in "Inorganic Syntheses." In this reaction, cyanogen is evolved spontaneously by the addition of a saturated aqueous KCN solution to a saturated aqueous $CuSO_4$ solution. The reaction is as follows:

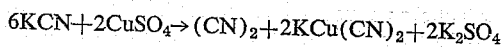

We have found after several trials that this method is not convenient as a general laboratory method for several reasons. First, a large volume of highly toxic KCN solution must be added to the reaction solution from a dropping funnel. The dangers in handling such toxic solutions are apparent. Second, during the addition of the aqueous KCN, there is a tendency for black, solid material to be formed. This is apparently paracyanogen which forms in the presence of the alkaline KCN solution. This reduces the yield and also causes difficulties in the experimental procedures, e.g., the dropping funnel tip and other restricted areas often become plugged with this black solid.

We have found that these difficulties can be avoided and good cyanogen yields obtained by our new and improved process. In our process, a ketone cyanohydrin, such as acetone cyanohydrin or diethyl ketone cyanohydrin and cupric sulfate are dissolved in water. At this point little or no reaction occurs. Then a dilute aqueous alkaline solution is slowly added. Immediately cyanogen is liberated as a gas and can be recovered by stripping the reaction solution with helium, nitrogen, or other inert gas, preferably at elevated temperatures for most efficient recovery. No polymerized cyanogen is produced and none of the reactants are appreciably toxic.

The following non-limiting examples are illustrative of the scope of this invention.

EXAMPLE I

A one-liter, three-necked flask fitted with a dropping funnel, a mercury-sealed stirrer, a condenser, and a Glas-col electric heating mantle was charged with 63.8 g. (0.4 mols) of cupric sulfate (a stoichiometric excess), 250 ml. water and 45.7 ml. (0.5 mol) of acetone cyanohydrin. A helium flow of 100 cc./min. was conducted through the mixture in the flask, through the condenser to a gas-sampling tube, and finally through two bubblers in series, each containing 100 ml. of 2.0 N NaOH. From the dropping funnel 50 ml. of 5.0 N NaOH was added slowly, dropwise, over a period of 34 minutes. Five minutes later heating was started and the solution was brought to reflux temperature, 84° C. During the run, the gas-sampling tube and the first bubbler were replaced twice for analysis. These changes took place after 20 minutes and 69 minutes, respectively. The third gas-sampling tube and bubbler were removed after 134 minutes. The contents of the bubblers were analyzed for cyanide ion content by titration with a standard silver nitrate solution (the Liebig method). This gave a measure of the total HCN and cyanogen in the gas stream. The gas samples in the sampling tubes were analyzed by means of a mass spectrometer to determine the relative amounts of the HCN and $(CN)_2$ in the gas stream. By combining these data, the cyanogen yields could be calculated. In this run, a 31.8% yield of cyanogen was obtained, based on acetone cyanohydrin charged, and assuming the reactions:

(1) $CH_3(OH)C(CN)CH_3 \rightarrow (CH_3)_2CO + HCN$
(2) 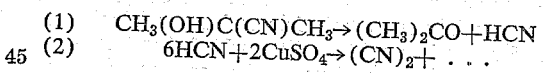

EXAMPLE II

In another experiment, using the apparatus described in Example I, the flask was charged with an aqueous solution containing 0.40 mol of $CuSO_4$. From the dropping funnel 1.09 mols of acetone cyanohydrin were added slowly, dropwise, over a period of 40 minutes. No alkali was present during the reaction. Only a minute trace of cyanogen was formed.

EXAMPLE III

In another experiment, using the apparatus of the preceding examples, 100 ml. of 4.0 N NaOH was added slowly, dropwise, to an aqueous solution of 10 g. $CuSO_4 \cdot 5H_2O$ and 10 ml. of acetone cyanohydrin. This reaction mixture consisted of 0.04 mol $CuSO_4$, 0.109 mol acetone cyanohydrin, and 0.40 mol NaOH. When the addition of the base was complete, the solution was refluxed for 1.5 hours. No cyanogen was formed either before, during, or after the refluxing.

EXAMPLE IV

Using the same apparatus as in the preceding example, an aqueous solution containing 0.40 mol cupric acetate is charged to the flask together with 1.10 mol of acetone cyanohydrin. From the dropping funnel 50 ml. of 5.0 N KOH is added slowly, dropwise, over a period of 30 minutes. The mixture is swept with helium at a flow of 100 cc./min. and analyzed for cyanogen content. At room temperature, a small yield of cyanogen is obtained. The reaction mixture is then brought to reflux temperature and stripped with helium for a period of 1.5 hours. A substantial yield of cyanogen is obtained from this reaction.

EXAMPLE V

In another experiment, using the apparatus of the preceding examples, an aqueous solution containing 0.60 mol of cupric bromide and 1.65 mols of diethyl ketone cyanohydrin is charged to the flask. From the dropping funnel, 75 ml. of 4.0 N $NH_4OH$ is added, dropwise, over a period of 50 minutes. The solution is heated to 60° C. and swept with helium at a flow of 100 cc./min. A substantial yield of cyanogen is obtained under these reaction conditions.

EXAMPLE VI

In a series of experiments, using the apparatus of the preceding examples, the relative proportions of acetone cyanohydrin and base were varied to determine optimum reaction conditions. In these runs the mass spectrometer was not used for analysis. The effluent gases were passed through a bubbler containing acidified silver nitrate to remove HCN. Then the gas stream was bubbled through dilute NaOH to convert the cyanogen into cyanide ion, which was analyzed by silver nitrate titration according to the Liebig method. The results of these experiments are shown in the following table:

*Table*

| Run No. | Mols of Reactants | | | $(CN)_2$ Yield [1] per pass, percent |
|---|---|---|---|---|
| | $CuSO_4$ | Acetone cyano-hydrin | NaOH | |
| A | 0.40 | 0.50 | 0.25 | 22.7 |
| B | 0.40 | 0.50 | 0.40 | 32.3 |
| C | 0.40 | 0.50 | 0.50 | 21.0 |

[1] Yields based on acetone cyanohydrin charged, assuming reactions set forth in Example I.

From these and other experiments, we have found that any ketone cyanohydrin is useful in the production of cyanogen according to this invention. In carrying out our process, a ketone cyanohydrin and a cupric salt are mixed and a small amount of alkali added thereto. Any ketone cyanohydrin may be used, whether alkyl, aryl, or mixed alkyl-aryl, and whether symmetrical or unsymmetrical. Ketone cyanohydrins which may be used include acetone cyanohydrin, diethyl ketone cyanohydrin, methyl ethyl ketone cyanohydrin, dibutyl ketone cyanohydrin, dioctyl ketone cyanohydrin, ethyl propyl ketone cyanohydrin, ethyl octyl ketone cyanohydrin, dinaphthyl ketone cyanohydrin, benzophenone cyanohydrin, and acetophenone cyanohydrin.

Cupric salts which may be used include any water-soluble cupric salt, such as the sulfate, acetate, bromide, chloride, and nitrate. Any aqueous alkali, preferably an alkali metal hydroxide or ammonium hydroxide, may be used to effect the reaction between the cyanohydrin and the cupric salt to generate cyanogen. The alkali is required to be present in the amount of of 0.05–1.0 mol per mol of the ketone cyanohydrin. Amounts of alkali less than 0.05 mol per mol of ketone cyanohydrin are ineffective in this reaction, while amounts substantially in excess of 1 mol per mol of ketone cyanohydrin apparently decompose the cyanohydrin without generating cyanogen. Preferably, the ketone cyanohydrin should be present in a slight molar excess over the base, e.g., 0.8–1.0 mol of base per mol of ketone cyanohydrin. The reaction may be carried out at any temperature in the range from about 15° to 90° C. but is preferably carried out at a temperature of 60–85° C. The order of addition of reactants is not critical. However, it is preferred to mix the aqueous solution of cupric salt and ketone cyanohydrin and add slowly thereto the dilute aqueous alkali to initiate the reaction. This addition of alkali to the other reactants is preferably at room temperature. After the alkali has been added, the solution should be stirred, stripped with helium, nitrogen, or other inert gas, and heated slowly to reflux. Stripping is continued at reflux until no more cyanogen is liberated. The solution is then cooled and sufficient ketone cyanohydrin and cupric salt added to remake the original concentrations of reactants. Further addition of alkali with stirring, stripping, and refluxing, as previously described, produces further quantities of cyanogen, thus utilizing the unreacted ketone cyanohydrin from the initial reaction.

While we have described our invention fully and completely as required by the patent statutes, including a full and complete description of what we now consider to be the best mode of carrying out our invention, we wish it to be understood that within the scope of the appended claims this invention may be practiced otherwise than as specifically described.

What is claimed is:

1. A method of preparing cyanogen which comprises reacting a ketone cyanohydrin with a cupric salt in aqueous alkaline solution containing alkali in the amount of 0.05–1.0 mol per mol of the ketone cyanohydrin.

2. A method in accordance with claim 1 in which the reaction temperature is in the range from about 15° to 90° C.

3. A method in accordance with claim 1 in which the ketone cyanohydrin is acetone cyanohydrin.

4. A method in accordance with claim 1 in which the ketone cyanohydrin is diethyl ketone cyanohydrin.

5. A method in accordance with claim 1 in which the ketone cyanohydrin and cupric salt are mixed in an aqueous solution and aqueous alkali slowly added thereto.

6. A method in accordance with claim 1 in which the alkaline solution is an aqueous solution of an alkali metal hydroxide.

7. A method in accordance with claim 6 in which the ketone cyanohydrin and cupric salt are mixed in an aqueous solution, aqueous alkali metal hydroxide is added to said solution at room temperature, the reaction mixture is stripped with an inert gas, and slowly heated to reflux temperature.

8. A method in accordance with claim 1 in which the cupric salt is selected from the group consisting of $CuSO_4$, $Cu(NO_3)_2$, $CuCl_2$, $CuBr_2$, and $Cu(CH_3CO_2)_2$.

9. A method of preparing cyanogen which comprises reacting acetone cyanohydrin with cupric sulfate in aqueout solution containing 0.05–1.0 mol of an alkali metal hydroxide per mol of acetone cyanohydrin at a temperature of about 15°–90° C.

10. A method of preparing cyanogen which comprises mixing acetone cyanohydrin with an aqueous solution of cupric sulfate, slowly adding to the mixture at room temperature an aqueous solution containing 0.05–1.0 mol of an alkali metal hydroxide per mol of acetone cyanohydrin, stripping the reaction mixture with an inert gas, slowly increasing the temperature of the reaction mixture to the reflux temperature, refluxing the mixture with continued stripping, and recovering the cyanogen stripped from the reaction mixture.

References Cited in the file of this patent

UNITED STATES PATENTS 2,841,472    Fierce et al. _____ July 1, 1958

OTHER REFERENCES

Yates et al.: "The Dissociation of Lactonitrile in Aqueous Solution," Journal of the American Chemical Society, vol. 74, 1952, pp. 4153–4155.